(12) United States Patent
Burd

(10) Patent No.: US 9,868,530 B2
(45) Date of Patent: Jan. 16, 2018

(54) ACOUSTICALLY AND THERMALLY INSULATED GALLEY SHELL

(71) Applicant: B/E AEROSPACE, INC., Wellington, FL (US)

(72) Inventor: Peter John Leslie Burd, Carmarthensire (GB)

(73) Assignee: B/E Aerospace, Inc., Wellington, FL (US)

( * ) Notice: Subject to any disclaimer, the term of this patent is extended or adjusted under 35 U.S.C. 154(b) by 449 days.

(21) Appl. No.: 13/773,908

(22) Filed: Feb. 22, 2013

(65) Prior Publication Data

US 2013/0248649 A1 Sep. 26, 2013

Related U.S. Application Data

(60) Provisional application No. 61/614,755, filed on Mar. 23, 2012.

(51) Int. Cl.
| | |
|---|---|
| *B64D 11/04* | (2006.01) |
| *B32B 5/16* | (2006.01) |
| *B32B 5/18* | (2006.01) |
| *B32B 5/24* | (2006.01) |

(52) U.S. Cl.
CPC ............ *B64D 11/04* (2013.01); *B32B 5/16* (2013.01); *B32B 5/18* (2013.01); *B32B 5/245* (2013.01); *B32B 2260/021* (2013.01); *B32B 2262/101* (2013.01); *B32B 2262/106* (2013.01); *B32B 2266/06* (2013.01); *B32B 2307/10* (2013.01); *B32B 2307/304* (2013.01); *B32B 2307/558* (2013.01); *B32B 2605/18* (2013.01); *Y02T 50/46* (2013.01)

(58) Field of Classification Search
None
See application file for complete search history.

(56) References Cited

U.S. PATENT DOCUMENTS

| | | | |
|---|---|---|---|
| 4,776,903 A | 10/1988 | Nordskog | |
| 5,876,540 A * | 3/1999 | Pannell | ............................ 156/91 |
| 2005/0211838 A1* | 9/2005 | Struve et al. | .................. 244/119 |
| 2007/0238379 A1* | 10/2007 | Bhatnagar et al. | ............ 442/135 |
| 2009/0090580 A1* | 4/2009 | Hotzeldt et al. | ............... 181/290 |

(Continued)

FOREIGN PATENT DOCUMENTS

| | | |
|---|---|---|
| FR | 2563153 A1 | 10/1985 |
| WO | 2005075188 A1 | 8/2005 |

OTHER PUBLICATIONS

Chinese Office Action, dated Aug. 31, 2015, 6 pages, from App. No. 201380015925.7.

(Continued)

*Primary Examiner* — Chinessa T Golden
(74) *Attorney, Agent, or Firm* — Donna P. Suchy

(57) ABSTRACT

The present invention is a light weight, easily fitted, and removable protective panel for an aircraft galley monument that incorporates a thermal barrier for heat loss control. The thermal barrier encloses a high percentage of the cold bridges between the chilled compartments of a galley cooler and the ambient surroundings, allowing an aircraft galley cooler to efficiently and economically meet its target temperature. The protective panel is multi-configurable and capable of being customized to the requirements of a particular aircraft.

8 Claims, 4 Drawing Sheets

(56) References Cited

U.S. PATENT DOCUMENTS

2009/0304979 A1*  12/2009  Mueller et al. ................ 428/69
2011/0101160 A1*   5/2011  Gomes et al. ............. 244/118.5
2011/0214199 A1    9/2011  Coffin
2011/0215199 A1    9/2011  Lee
2011/0248458 A1*  10/2011  Belanger et al. .......... 280/47.35

OTHER PUBLICATIONS

EPO, International Search Report and Written Opinion from International Patent Application No. PCT/US2013/032827 dated Jul. 1, 2013.

* cited by examiner

ACOUSTICALLY AND THERMALLY INSULATED GALLEY SHELL

CROSS-REFERENCES TO RELATED APPLICATIONS

This application claims priority from U.S. Provisional Application No. 61/614,755, filed Mar. 23, 2012, incorporated herein by reference in its entirety.

BACKGROUND

Large commercial aircraft that service hundreds of passengers at a time is typically equipped with a service station, or galley, that is used to house all of the equipment and foods for the passengers' and crew's meal and beverage service. The galley is typically a built in structure that is part of the aircraft, designed to meet the needs of the particular aircraft while adhering to the goals and limitations of weight conservation and space efficiency that is critical to all aircraft. Each galley will typically have ovens to heat food, beverage makers to make coffee and espresso, waste disposal areas, and chillers or coolers to store the meals and perishables until they are ready to be served. These chillers or coolers and typically built into the galley, and must be able to store milk, fruits, frozen meals, and other types of perishables at a temperature that allows the food to be safely served after several hours in flight.

In order to meet the health and safety requirements to preserve perishable foods for consumption by passengers during an airlines in-flight catering service, a storage structure such as a galley has to have a level of thermal insulation that is capable of resisting conductive losses to a level that will allow the galley to meet or exceed the manufacturer's and airworthiness authority's requirements for the safe storage of food stuffs over a specific period, using the galley chilling system provided for that galley. The minimum thermal resistance level of a food storage structure is usually specified as an average value for the entire monument, which takes into account losses through cold bridges between the chilled compartments and the warmer exterior ambient temperatures.

These cold bridges typically take the form of metallic items such as floor fittings, edge members, potted inserts, bobbins, embedded and mouse hole blocks, sliding tables, door hinges, latches, and access panels, as well as poorly insulated nonmetallic areas such as recessed panels, cut outs and cable passes. Each of these types couplings and structures conduct heat into the galley, which must be removed by the refrigeration unit. The amount of heat that is allowed across these structures is dependent upon a property called the thermal resistance. The average thermal resistance performance of a chilled storage structure such as a chiller or cooler equates to the capability of the nonmetallic panel that forms the housing, less any losses through cold bridges and poorly insulated areas.

Galley panels made from a 13 mm (½") Nomex® cored pre-impregnated structural panel is insufficient to maintain aircraft galley chilled compartments at or below the required safe temperature for perishable food stuffs. Therefore, in order to improve the monument's thermal capability to allow perishables to be stored safely, either the thickness of the panel has to be increased or supplemental insulation has to be added to the structure.

In addition to the thermal losses, the reduction of intrusive noise into an aircraft cabin, usually produced by the routine operation of an in-flight airline catering service, is a prime objective of the aircraft manufacturers. Much of this noise can be generated by galley insert equipment ("GAINS"), such as ovens, refrigerators, beverage makers, and the like, along with the incumbent noise introduced by the cabin crew preparing meals. That is, the preparing of meals includes removing standard meal boxes from their compartments, filling meal carriers for ovens, opening and closing compartment doors, moving carts from their compartments, and so on. Aircraft manufacturers seek to reduce the overall noise in the passenger cabin by providing various sound attenuation mechanisms such as using sound absorbing materials. By incorporated such materials into the galley surfaces, the acoustic levels inside the cabin due to the preparation and clean-up of the beverage and meal service can be significantly reduced.

SUMMARY OF THE INVENTION

The present invention is a light weight, easily fitted, and removable protective panel for an aircraft galley monument that incorporates a thermal barrier for heat loss control. The thermal barrier encloses a high percentage of the cold bridges between the chilled compartments of a galley cooler and the ambient surroundings, allowing an aircraft galley cooler to efficiently and economically meet its target temperature. The protective panel is multi-configurable and capable of being customized to the requirements of a particular aircraft. In addition, the thermal barrier provides insulation where it is needed most, while saving weight by eliminating areas that are not as critical. The panels are versatile enough to be used with non-chilled monuments as well, without the insulation. Due to the panel's structure and materials, exceptionally high insulation values are possible with a minimum thickness, resulting in a very small increase to the overall galley foot print. In a preferred embodiment, the galley can include an acoustic suppressing layer as well to yield a super silent galley as well as a thermally efficient galley. This concept can be extended to use the center line galley panels as cabin sound absorbers, reducing the overall aircraft cabin noise levels. It has been shown that the shell surface remains easily cleanable even if used for cabin sound absorption.

DETAILED DESCRIPTION OF THE PREFERRED EMBODIMENTS

Figure 1:
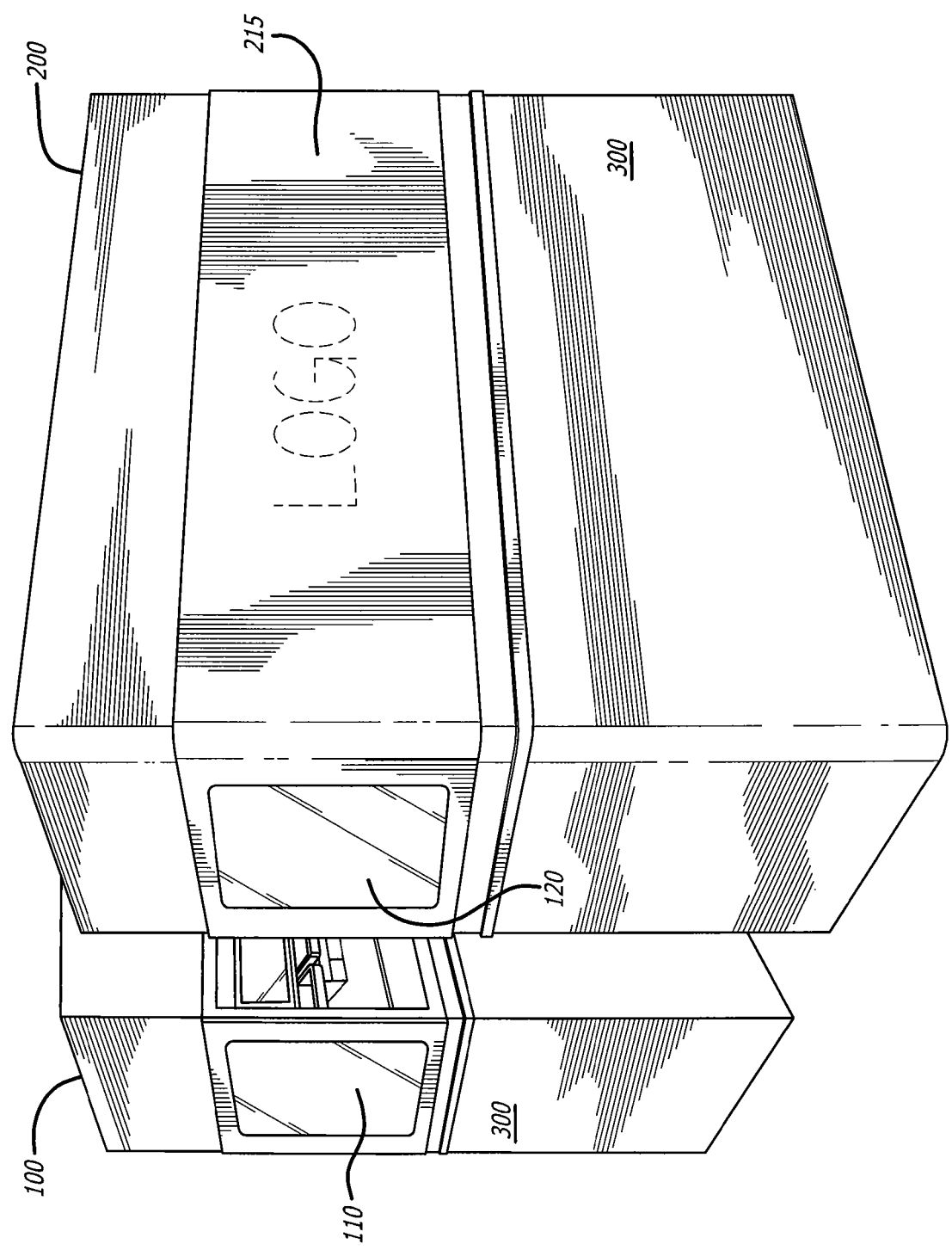
FIG. 1 is a perspective view of the exterior of a galley incorporating the present invention.

FIG. 1 illustrates an exterior view of a modular integrated galley comprising a stand-alone beverage station 100 and a stand-alone food preparation station 200. The beverage station 100 provides coffee, espresso, and a variety of beverages that can be served to passengers, while the food preparation station 200 includes ovens, refrigerators, and equipment necessary for the storage 24 (see FIG. 2), preparation, and clean-up of meal service. On the exterior of each station 100, 200 is a display screen 110,120, such as for example an LED screen, that can be used to provide instructions to passengers, display advertisements that can generate revenue for the airlines, or provide information on the amenities provided by the galley. The exterior of each station is also preferably equipped with a branding placeholder 215 that can be used to promote the airlines or provide advertising space that can be leased by the airlines. The branding placeholder 215 is large and in full view of the passengers for maximum exposure and visibility. Both the beverage station 100 and the food preparation station 200 are formed with an outer shell 300 that serves to thermally insulate, and optimally acoustically attenuate, the galley from the environment.

Figure 2:
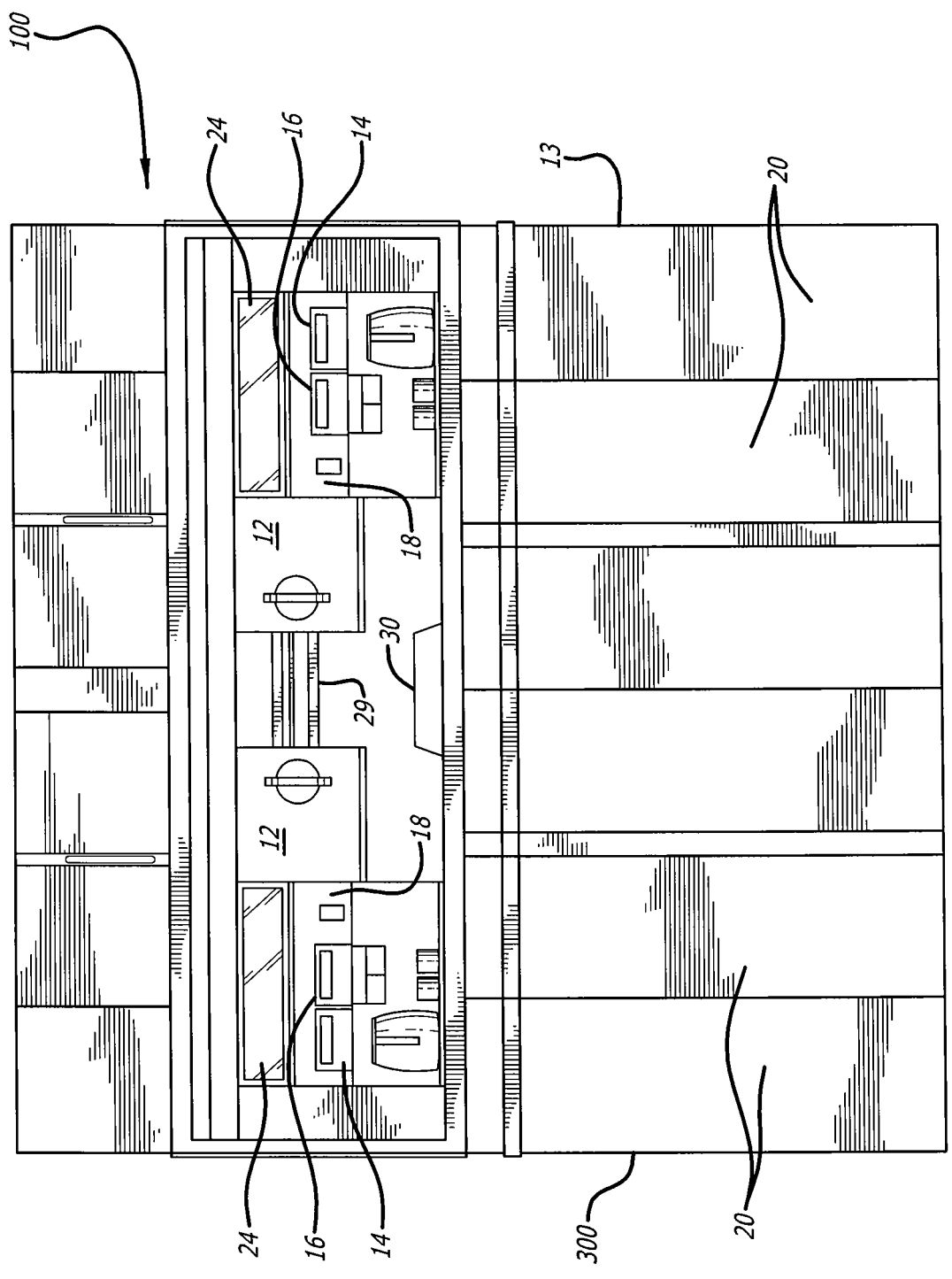
FIG. 2 is a front view of a preferred embodiment of a beverage station.

FIG. 2 illustrates an exemplary stand-alone beverage station 100 of the galley, comprising a light weight structure 13 encased in a thermal shell 300. The beverage station 100 is adapted to serve as a beverage distribution center in a commercial aircraft. The modular beverage center 100 features several integrated equipment for servicing passengers, including a side refrigeration unit for self-serving of soft drinks to passengers, two half ovens 12, two coffee makers 14, two espresso makers 16, and two hot water dispensers 18. The structure 13 includes six beverage cart storage compartments 20 that house beverage carts used to facilitate service to passengers, a sink 30 and faucet 29, a top loading trash chute, task lighting, and a touch screen user interface. All of the elements are arranged in a cost and space efficient manner that allows functionality without sacrificing performance.

Figure 3:
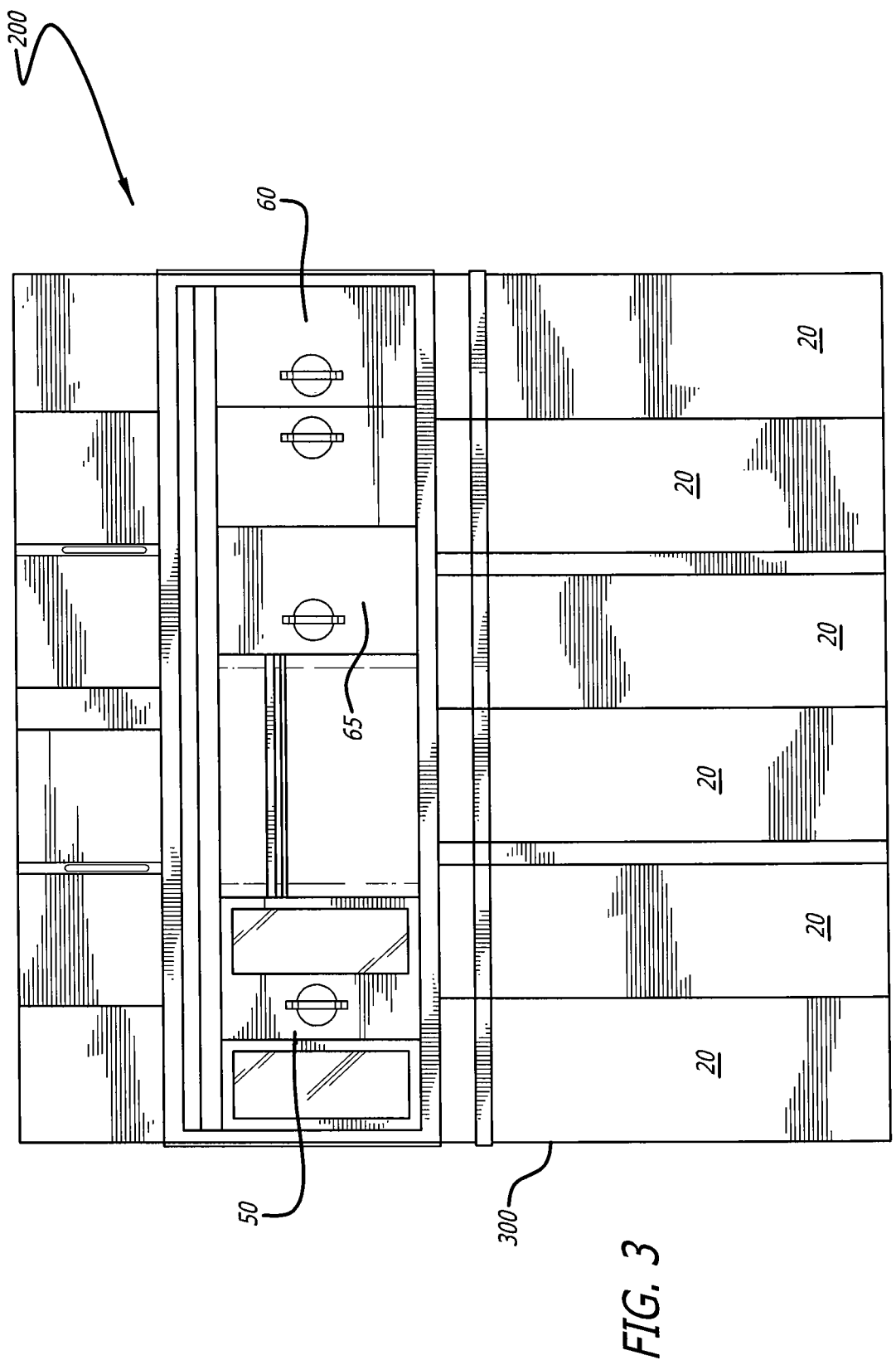
FIG. 3 is a front view of a first embodiment of a food preparation station.

FIG. 3 illustrates a food preparation station 200 that operates in conjunction with the beverage station 100 to achieve a full-service galley. The food preparation station 200 includes a side refrigeration unit that serves as a passenger self-service cooler, a double refrigerator 50, a double oven 60, a half oven 65, six beverage cart storage compartments 20, and an extendable work deck. As with the beverage station, the food preparation station is encased in a thermal shell 300 that insulates the contents of the galley and keeps perishables stored therein at the proper temperature.

Figure 4:
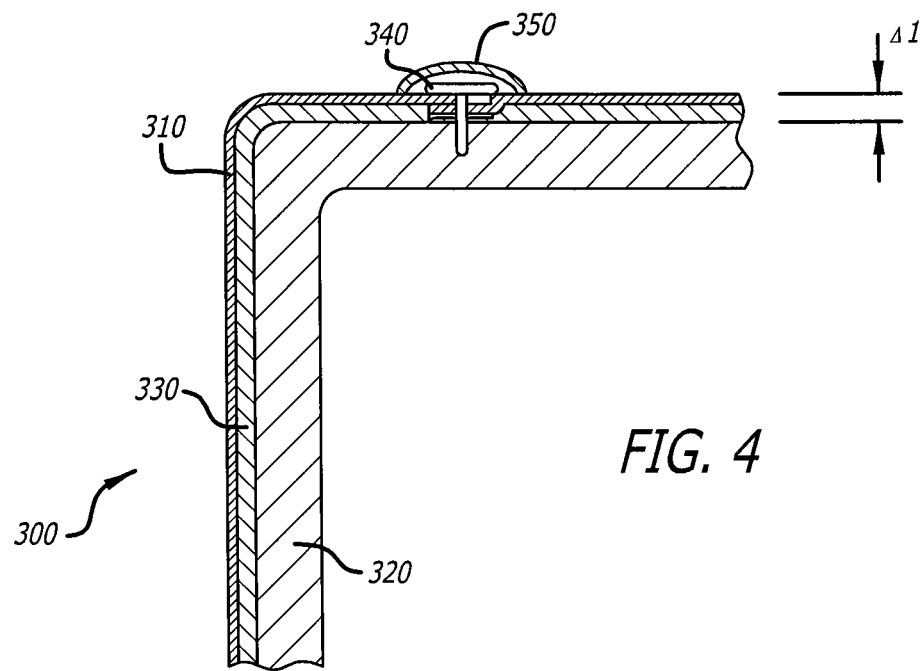
FIG. 4 is a cross-sectional view of a portion of the outer thermal shell of the galley of FIGS. 1-3.

FIG. 4 illustrates an outer shell 300 enclosing the exterior surface of the aircraft monuments 100, 200 of FIGS. 1-3. The shell 300 includes the back, and both side walls (e.g. center line galley), which allows the shell 300 to be easily attached and/or removed when the aircraft is in service. The shell 300 includes an outer layer 310 serving as an impact resistant skin having a depth of approximately 1.5 millimeters. The skin 310 is formed of a hard material such as a carbon reinforced composite pre-impregnated, fiberglass, Kevlar, or other thermoplastic, and is designed to be fitted in sections to the monument. The skin 310 performs two functions: a protective layer for the vacuum insulated panels ("VIP") and as a carrier for an airline's choice of décor or trim. The skin 310 may be bonded in a conventional manner using a high temperature contact adhesive. Below the skin 310 is a layer of carbon fiber composite material 320 that is bonded to the monument. The carbon fiber composite material can have a thickness of approximately ten millimeters (10 mm).

Sandwiched between the impact resistant outer skin 310 of the shell 300 and the carbon fiber composite panel 320 is a layer of thermal insulation 330, such as Nanopore™ available from Nanopore Inc. of Albuquerque, N.M. The thermal insulation 330 may be in the form of 3 mm thick vacuum insulation panel (VIP) tiles, which may alternatively be attached to either the monument structure 13 or to the inner wall of the outer skin 310. One benefit of using the tiles described above is that the thermal insulation tiles can be selectively located and positioned where an improvement to the thermal insulation properties of the galley are required. For non-chilled areas that do not need thermal insulation, the shell 300 may substitute a light weight filling panel or core, or spacers to maintain the correct distance from the structural outer surface. In this manner, both cost and weight are minimized while maximizing thermal efficiency.

To bind the skin 310 of the shell 300 to the carbon fiber composite panel 320, a series of anchor pins 340 are inserted through the skin and into the panel, compressing the multi-layers into a rigid panel. An aesthetic anchor pin cover 350 can be used over the pin 340 to present a cleaner, sleeker appearance to the galley.

Figure 5:
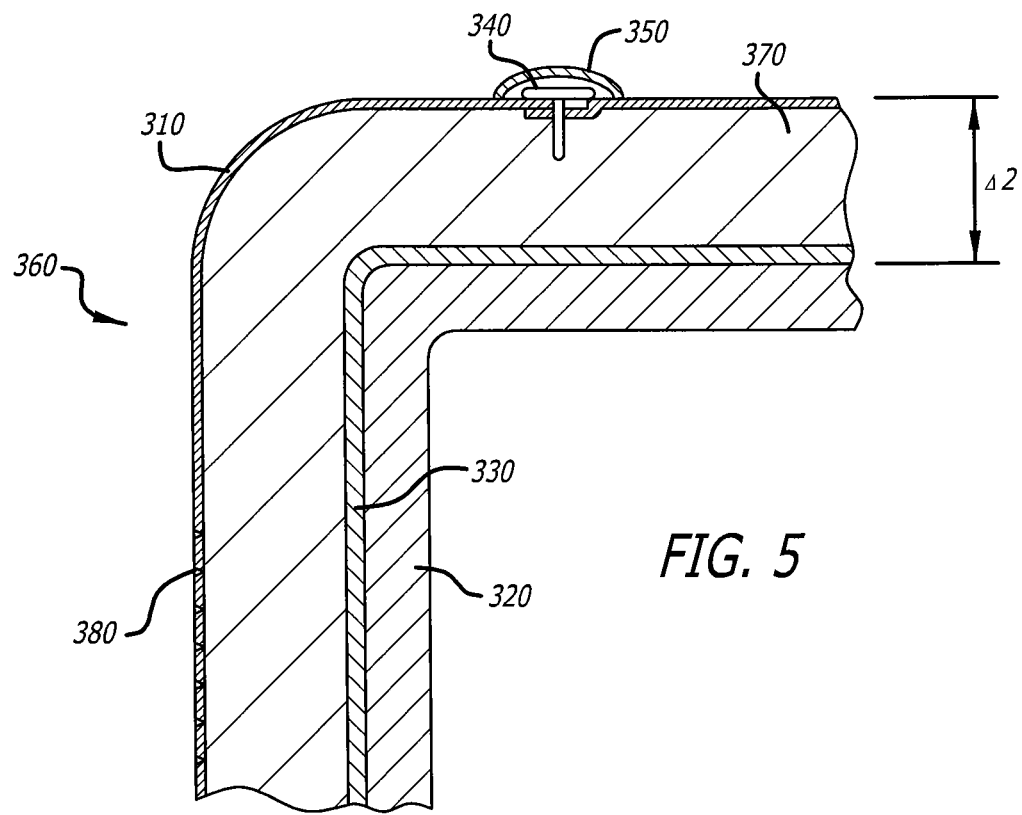
FIG. 5 is a cross-sectional view of a portion of the outer thermal shell of the galley of FIGS. 1-3 with acoustic suppressant.

FIG. 5 illustrates a second embodiment of a shell 360 that includes the structure of FIG. 4, but also includes an additional layer consisting of 20-25 mm of and acoustic foam 370, such as an open cell acoustic foam. The foam 370, together with a 3 mm layer of VIP thermal insulation 330, serves the dual purposes of thermal insulation along with the absorption of the reverberant sound generated at the working face of the galley. The foam 370 may alternatively be attached either to the outer surface of the VIP panels 330, or to the inside surface of the outer skin 310. Thermally, the galley will achieve an even better resistance to heat loss due to the inherent thermal insulation properties of the foam 370, and the foam and thermal panel combination enhances the monument's external impact resistance as well as its impact sound absorbent qualities.

The removable outer skin 310 serves as a protective barrier that provides damage protection to the otherwise susceptible thermal layer 330, and acts as a carrier for external décor trim. The VIP thermal barrier 330 further serves to enclose all potential cold bridges from chilled compartments on all but the working face of the monument (e.g., center line galley). Lateral refrigerated galleys can be insulated on the reverse surface using VIP panels without the need for a protective skin 310. An advantage of the present system is that damaged skin 310 and/or VIP panels 330 can be replaced in service without disturbing the monument's aircraft attachment points.

Selective placement of the thermal panels 330 (and the sound absorbing foam 370) allow enhanced insulation at the locations where it is identified as being important or effective, leaving other areas untreated to save weight. The invention adds only a minimal increase Δ1 of 4.5 millimeters in the example of FIG. 4, and 24.5 millimeters in the example of FIG. 5 to the galley's foot print while providing superior thermal loss resistance and acoustic attenuation.

By using an open weave pre-impregnated carbon reinforced panel 380 for the skin 310, and micro perforating the décor laminate, the outer shell 360 absorbs most exterior noise, reducing the overall sound levels in the passenger cabin. The present invention is adaptable to all types of narrow or wide bodied commercial aircraft monuments both for new and existing airplane types or variants.

I claim:

1. An improved aircraft monument, comprising:
  an aircraft galley monument housing at least one refrigeration unit; and
  a protective panel forming at least a part of the aircraft galley monument, the protective panel including:
    an impact-resistant outer skin comprising an open weave pre-impregnated carbon reinforced panel;

a carbon fiber composite panel;

a thermal insulation panel selectively disposed in contact with a metallic cold bridge, the metallic cold bridge extending across the thermal insulation panel, the thermal insulation panel comprised of a vacuum insulation panel tiles; and an insulating layer of open cell acoustic foam within the panel.

2. The improved aircraft monument of claim 1, wherein the thermal insulation panel is sandwiched between the impact-resistant outer skin and the carbon fiber composite panel.

3. The improved aircraft monument of claim 1, further comprising spacers in place of said thermal insulation panel in areas where there are no cold bridges.

4. The improved aircraft monument of claim 1, wherein a thickness of the thermal insulation panel is approximately twice a thickness of the impact-resistant outer skin.

5. The improved aircraft monument of claim 1, wherein the protective panel is applied in sections to the aircraft galley monument.

6. The improved aircraft monument of claim 1, wherein the open cell acoustic foam has a thickness that is at least twice a thickness of the carbon-fiber composite panel.

7. The improved aircraft monument of claim 1, wherein anchor pins attach the impact resistant outer skin to carbon fiber composite panel.

8. The improved aircraft monument of claim 7, wherein anchor pins are covered by an anchor pin cover.

\* \* \* \* \*